March 22, 1966 D. GERSTENBERG 3,242,006
TANTALUM NITRIDE FILM RESISTOR
Filed Oct. 3, 1961 2 Sheets-Sheet 1
FIG. 1
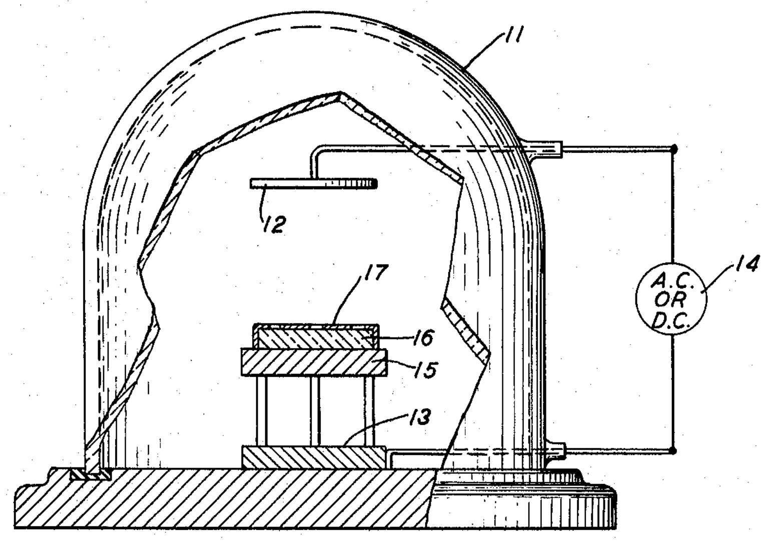
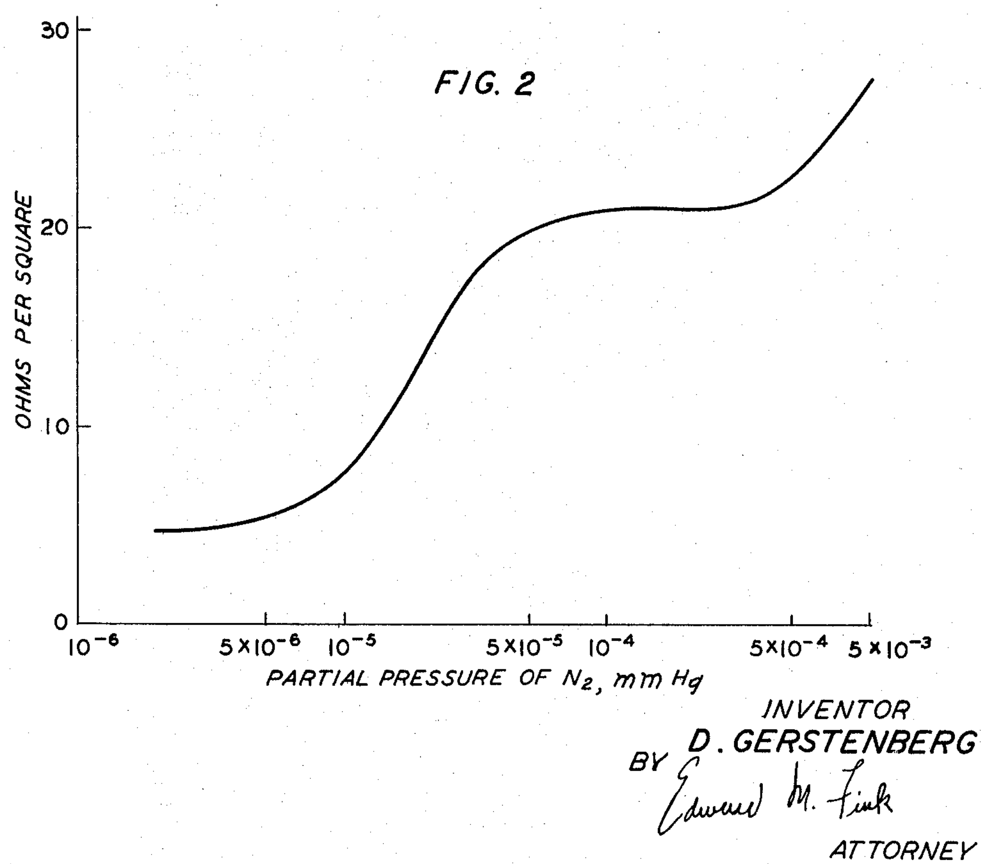
INVENTOR
D. GERSTENBERG
BY Edward M. Fink
ATTORNEY March 22, 1966 D. GERSTENBERG 3,242,006

TANTALUM NITRIDE FILM RESISTOR

Filed Oct. 3, 1961 2 Sheets-Sheet 2

INVENTOR
D. GERSTENBERG
BY Edward M. Fink
ATTORNEY 3,242,006

TANTALUM NITRIDE FILM RESISTOR

Dieter Gerstenberg, Morristown, N.J., assignor to Bell Telephone Laboratories, Incorporated, New York, N.Y., a corporation of New York Filed Oct. 3, 1961, Ser. No. 142,702
5 Claims. (Cl. 117—201)

This invention relates to film resistors including a layer of tantalum nitride.

More particularly, the present invention relates to film resistors of high stability including a layer of tantalum nitride which evidence electrical properties which compare favorably with those of conventional prior art resistors. In addition to obtaining stable films, a tantalum nitride (TaN) film having a cubic sodium chloride type structure not heretofore reported in the literature has been observed.

The invention will be more readily understood from the following detailed description, taken in conjunction with the accompanying drawing in which:

FIG. 1 is a front elevational view, partly in section, of an apparatus suitable for use in producing a film of tantalum nitride by reactive sputtering in accordance with the present invention;

FIG. 2 is a graphical representation on coordinates of ohms/square against the partial pressure of nitrogen in millimeters of mercury showing the variations of resistivity at 25° C. of 1000 A. tantalum films sputtered in varying partial nitrogen pressures with a total pressure of 15 microns of argon;

Figure 3:
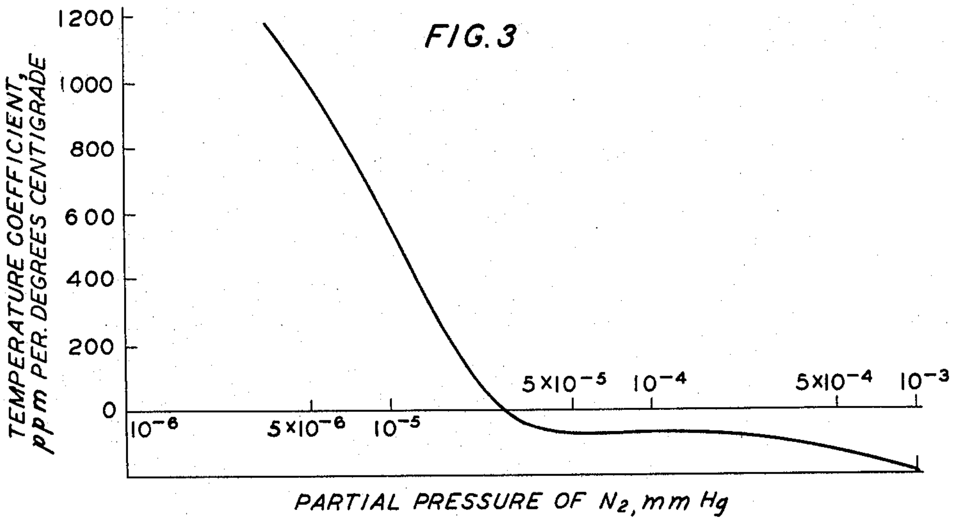
Figure 4:
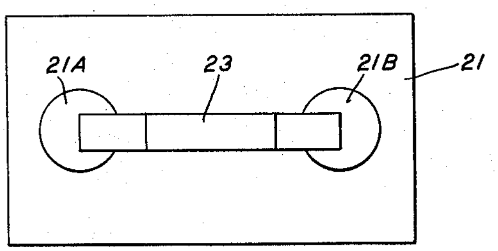

FIG. 3 is a graphical representation on coordinates of temperature coefficient in parts per million per degree centigrade against the partial pressure of nitrogen in millimeters of mercury showing the variations of temperature coefficient of resistivity at 25° C. of 1000 A. tantalum films sputtered in varying partial pressures of nitrogen at a total pressure of 15 microns of argon; and FIG. 4 is a plan view of a tantalum nitride film resistor.

With reference more particularly to FIG. 1, there is shown an apparatus suitable for depositing a tantalum nitride film by cathodic sputtering. Shown in FIG. 1 is a vacuum chamber 11 in which are disposed cathode 12 and anode 13. Cathode 12 may be composed of tantalum or, alternatively, may serve as the base for the tantalum which latter may be in the form of a coating, foil or other suitable physical form.

A source of electrical potential 14 is shown connected between cathode 12 and anode 13. Platform 15 is employed as a positioning support for substrate 16 upon which the sputtered film is to be deposited. Mask 17 is placed on substrate 16 to restrict the deposition to this area.

The present invention is conveniently described in detail by reference to an illustrative example in which tantalum is employed as cathode 12 in the apparatus shown in FIG. 1.

Preferred substrate materials for this invention are glasses, glazed ceramics, etc. These materials meet the requirements of heat resistance and nonconductivity essential for substrates utilized in reactive sputtering techniques.

Substrate 16 is first vigorously cleaned. Conventional cleaning agents are suitable, the choice of a specific one being dependent upon the composition of the substrate itself. For example, where the substrate consists of glass, boiling in aqua regia or hydrogen peroxide is a convenient method for cleaning the surface.

Substrate 16 is placed upon platform 15, as shown in FIG. 1, and mask 17 is then suitably positioned. Platform 15 and mask 17 may be fabricated from any refractory material. However, it may be convenient to use a metal, such as aluminum, for ease in fabricating mask 17. To obtain sharply defined deposits, it is necessary to have mask 17 bearing against substrate 16 under externally applied pressure.

The vacuum chamber is next evacuated and nitrogen is admitted at a dynamic pressure and, after attaining equilibrium, argon is admitted. The extent of the vacuum is dependent on consideration of several factors.

Increasing the inert gas pressure and thereby reducing the vacuum within chamber 11 increases the rate at which the tantalum being sputtered is removed from the cathode and accordingly increases the rate of deposition. The maximum pressure is usually dictated by power supply limitations since increasing the pressure also increases the current flow between cathode 13 and anode 12. A practical upper limit in this respect is 20 microns of mercury for a sputtering voltage of 3000 volts although it may be varied depending on the size of the cathode, sputtering rate, etc. The ultimate maximum pressure is that at which the sputtering can be reasonably controlled within the prescribed tolerances. It follows, from the discussion above, that the minimum pressure is determined by the lowest deposition rate which can be economically tolerated.

After the requisite pressure is attained, cathode 12, which may be composed of tantalum or alternatively may be an aluminum disc covered with tantalum, for example, in the form of a foil, is made electrically negative with respect to anode 13.

The minimum voltage necessary to produce sputtering is about 3000 volts. Increasing the potential difference between anode 13 and cathode 12 has the same effect as increasing the pressure, that of increasing both the rate of deposition and the current flow. Accordingly, the maximum voltage is dictated by consideration of the same factors controlling the maximum pressure.

The spacing between anode and cathode is not critical. However, the minimum separation is that required to produce a glow discharge which must be present for sputtering to occur. Many dark striations are well known and have been given names, as for example, Crooke's Dark Space (see Joos, "Theoretical Physics," Haffner, New York, 1950, page 435 et set.). For the best efficiency during the sputtering step, substrate 16 should be positioned immediately without Crooke's Dark Space on the side closest to the anode 13. Location of substrate 16 closer to cathode 12 results in a metal deposit of poorer quality. Locating substrate 16 further from cathode 12 results in the impingement on the substrate by a smaller fraction of the total metal sputtered, thereby increasing the time necessary to produce a deposit of given thickness.

It should be noted that the location of Crooke's Dark Space changes with variations in the pressure, it moving closer to the cathode with increosing pressure. As the substrate is moved closer to the cathode it tends to act as an obstacle in the path of gas ions, which are bombarding the cathode.

Accordingly, the pressure should be maintained sufficiently low so that Crooke's Dark Space is located beyond the point at which a substrate would cause shielding of the cathode.

The balancing of these various factors of voltage, pressure and relative positions of the cathode, anode and substrate to obtain a high quality deposit is well known in the sputtering art.

With reference now more particularly to the example under discussion, by employing a proper voltage, pressure and spacing of the various elements within the vacuum chamber, a layer of tantalum nitride is deposited in a configuration determined by mask 17. The sputtering is conducted for a period of time calculated to produce the desired thickness.

For the purposes of this invention, the minimum thickness of the layer deposited upon the substrate is approximately 400 angstroms. There is no maximum limit on this thickness although little advantage is gained by an increase beyond 1500 angstroms.

FIG. 2 is a graphical representation showing the resistivity in ohms per square at 25° C. of tantalum nitride films which are approximately 1000 angstroms thick sputtered with a total pressure of 15 microns of argon plotted as a function of the partial pressure if nitrogen. The points on the graph represent the average over the inner six resistor strips on gold terminated $1.5\times3$ inch glass slides which have been sputtered at a temperature of $400\pm10°$ C.

As is noted from the graph, for the particular group of resistor strips there is little change in resistivity below $5\times10^{-6}$ millimeters of mercury. Above a partial pressure of nitrogen of $5\times10^{-6}$ millimeters of mercury the resistivity increases from 5 to approximately 20 ohms per square and remains substantially constant from $5\times10^{-5}$ millimeters up to a partial pressure of nitrogen of $5\times10^{-4}$ millimeters of mercury.

An analysis of FIG. 3, which shows the temperature coefficient plotted against partial pressure of nitrogen for the same group of resistors, indicates that the rise in resistivity between $5\times10^{-6}$ and $2\times10^{-5}$ millimeters of mercury is accompanied by a decrease in the temperature coefficient of resistivity from +1400 p.p.m./° C. to −60 p.p.m./° C. Between $5\times10^{-5}$ millimeters and $5\times10^{-4}$ the temperature coefficient is constant at a value of $70\pm10$ p.p.m./° C.

The use of nitrogen at partial pressures between $0.5\times10^{-4}$ and $5\times10^{-4}$ millimeters of mercury results inresistivity and temperature coefficient plateaus, respectively, of 200 $\mu$ ohm-centimeters and 70 p.p.m./° C. Such operating plateaus are of great significance in obtaining reproducible results in day to day production of resistors. In analyzing the data shown graphically in FIGS. 2 and 3 it must be noted that the indicated pressures are specific to the pumping speed of the particular vacuum system employed, but the general shape of the curve is retained. Thus, it may be stated that the present invention is operable over a (partial pressure of nitrogen) range of $10^{-6}$ to $10^{-3}$ millimeters of mercury.

In FIG. 4 there is shown a substrate 21 composed of one of the refractory insulating materials usually employed in the construction of printed circuit boards, which has deposited thereon two terminals, 21A and 21B, of electrically conductive metal such as gold, and a layer 23 of tantalum nitride. Conductive terminals 21A and 21B are not essential but are customarily employed in construction of printed circuit boards.

With reference once again to the example under discussion, the substrate is maintained at temperatures within the range of 300 to 500° C. during the reactive sputtering process.

Following the deposition technique, the tantalum nitride film is heated in the presence of air at temperatures within the range of 250 to 400° C., thereby stabilizing the nitride films.

Electron diffraction studies indicate that reactive sputtering of tantalum nitride films have properties suitable for resistor purposes. The films so produced include tantalum nitride of hexagonal structure ($Ta_2N$), tantalum nitride of a cubic structure (TaN) and mixtures of $Ta_2N$ and TaN, the latter being favored by sputtering with nitrogen partial pressures of $10\times10^{-5}$ millimeters of mercury and higher. At pressures within the range of $4\times10^{-4}$ to $10\times10^{-5}$ millimeters of mercury varying compositional ranges of $Ta_2N$ and TaN are produced whereas at pressures lower than $4\times10^{-5}$ millimeters of mercury the composition consists essentially of $Ta_2N$.

Several examples of the present invention are described in detail below. These examples and the illustration described above are included merely to aid in the understanding of the invention, and variations may be made by one skilled in the art without departing from the spirit and scope of the invention.

EXAMPLE I

This example describes the fabrication of a tantalum nitride resistor in accordance with the present inventive technique.

A sputtering apparatus similar to that shown in FIG. 1 was used to produce the tantalum nitride layer. The cathode consisted of a circular tantalum disk 40 mils thick and 4 inches in diameter of high purity. In the apparatus actually employed, the anode was grounded, the potential difference being obtained by making the cathode negative with respect to ground.

A glass microscope slide, approximately 1½ inches in width and 3 inches in length was used as a substrate. Gold terminals, ⅜ inch by ¼ inch were silk screened on each longitudinal side of the substrate. The gold terminations were fired at 565° C. and had a final resistance of approximately 0.2 ohm per square. The terminated slides were then cleaned using the following procedure. The slides were first washed in a detergent such as "Alconox," to remove large particles of dirt and grease. Next, there followed a tap water rinse, a ten minute boil in a 10 percent hydrogen peroxide solution, a distilled water rinse, a ten minute boil in distilled water, and storage in an oven maintained at 150° C. until ready for use.

The vacuum chamber was evacuated by means of a roughing pump and an oil diffusion pump to a pressure of approximately $2\times10^{-6}$ millimeters of mercury after a time period within the range of 30 to 45 minutes. Next, the substrate is heated to a temperature of approximately 400° C. After obtaining such temperature, nitrogen is admitted into the chamber at a dynamic pressure and after obtaining equilibrium argon is admitted into the chamber at a pressure of approximately 15 microns. During the sputtering reaction the partial pressure of the nitrogen was maintained at approximately $10\times10^{-5}$ millimeters of mercury.

The anode and cathode were spaced approximately 2.5 inches apart, the washed substrate being placed therebetween at a position immediately without Crooke's Dark Space. The substrate is maintained at a temperature of 400° C. during the sputtering reaction. A D.-C. voltage of 5000 volts was impressed between cathode and anode. In order to establish equilibrium when first beginning the sputtering, it was found helpful to sputter on a shield for several minutes, thereby assuring reproducible results.

Sputtering was conducted for approximately 10 minutes, producing a layer of approximately 1000 angstroms.

Following the sputtering treatment, the resistance in ohms and specific resistivity in micro ohms-centimeters was measured. Next the sputtered resistor was heated in air for 1 hour at a temperature of 400° C. The device so fabricated was again measured to determine its resistance. To determine the stability of the resistor, aging was conducted by thermal treatment at 150° C. for 1000 hours. The results are set forth in the table below.

Electron diffraction analysis of the tantalum nitride (TaN) film revealed a sodium chloride type structure rather than the anticipated hexagonal type structure.

EXAMPLE II

The procedure of Example I was repeated with the exception that the partial pressure of nitrogen was maintained at $18\times10^{-5}$ millimeters of mercury during the sputtering reaction. The resultant tantalum nitride resistor had a sodium chloride type structure.

EXAMPLE III

The procedure of Example I was repeated with the exception that the partial pressure of nitrogen during the sputtering reaction was maintained at $50\times10^{-5}$ millimeters of mercury. The resultant tantalum nitride resistor had a sodium chloride type structure.

*Table*

| Example | F.T. in A. | $PN_2$ in mm. of Hg | Spec. Res. in μΩ cm. | Initial Res. in Ω | Res. in Ω after heat treat. | Resist in— Ω after 1,000 hrs at 150° C. | Resist in— ΔR percent after 1,000 hrs. at 10° C. |
|---|---|---|---|---|---|---|---|
| 1. Sputtered for 10 min | 1,000 | $10\times10^{-5}$ | 251 | 377.91 | 411.88 | 412.03 | 0.03 |
| 2. Sputtered for 10 min | 1,000 | $18\times10^{-5}$ | 214 | 320.90 | 347.90 | 348.02 | 0.04 |
| 3. Sputtered for 10 min | 1,000 | $50\times10^{-5}$ | 237 | 355.21 | 412.11 | 412.07 | 0.001 |

F.T.=film thickness.
$PN_2$=partial pressure of nitrogen.

An analysis of the data set forth in the table indicates that the resistance of the tantalum nitride films are appreciably increased by the heat treatment, so producing an unusually stable resistor as is seen from the data obtained upon aging.

While the invention has been described in detail in the foregoing specification and the drawing similarly illustrates the same, the aforesaid is by way of illustration only and is not restrictive in character. It will be appreciated by those skilled in the art that the novel resistors may be fabricated by methods other than reactive sputtering, such methods being well known by those skilled in the art. The several modifications which will readily suggest themselves to persons skilled in the art are all considered within the scope of this invention, reference being had to the appended claims.

What is claimed is:

1. A stable metal film resistor including successively a non conducting substrate and a thin film consisting essentially of tantalum nitride.

2. A resistor in accordance with claim 1 wherein said film has a thickness of at least 400 A.

3. A resistor in accordance with claim 1 wherein said film consists essentially of tantalum nitride (TaN) of cubic structure.

4. A resistor in accordance with claim 1 wherein said film consists essentially of tantalum nitride ($Ta_2N$) of hexagonal structure.

5. A resistor in accordance with claim 1 wherein said film consists essentially of a mixture of TaN and $Ta_2N$.

References Cited by the Examiner

UNITED STATES PATENTS

| | | | |
|---|---|---|---|
| 420,881 | 2/1890 | Langhans | 117—201 |
| 896,341 | 8/1908 | Whitney | 23—191 |
| 1,123,585 | 1/1915 | Peacock | 23—191 |
| 2,003,592 | 6/1935 | Hediger | 117—201 |
| 2,836,514 | 5/1958 | Munster | 117—106 |
| 2,886,502 | 5/1959 | Holland | 204—192 |
| 2,917,442 | 12/1959 | Hanlet | 204—192 |
| 3,063,858 | 11/1962 | Steeves | 117—5.1 |

FOREIGN PATENTS 86,825 12/1921 Austria.

OTHER REFERENCES

Moers: "Zeitschrift fur annorganische und allegemeine Chemie," 198 (pp. 262–275), 1931, Q.D. 1.24.

Pascal: "Nouveau Traite De Chimie Minerale," Tome XII, Masson and Cie, pp. 534–536.

Campbell et al.: "J. Electrochemical Soc.," vol. 96, No. 5, Nov. 1949, pp. 318–333 (pp. 319–320 relied on).

Powell et al.: "Vapor Plating," 1955, pp. 95–102, John Wiley and Sons, N.Y., TS 695 B 3.

JOSEPH B. SPENCER, *Primary Examiner.*

RICHARD D. NEVIUS, *Examiner.*